Aug. 15, 1939.　　　　J. B. WHITTED　　　　2,169,862
ELECTRIC FUEL PUMP
Filed March 5, 1937　　　　3 Sheets-Sheet 1
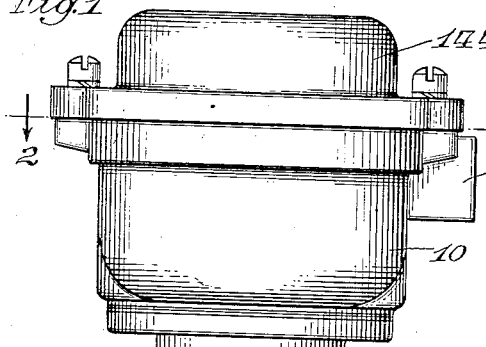
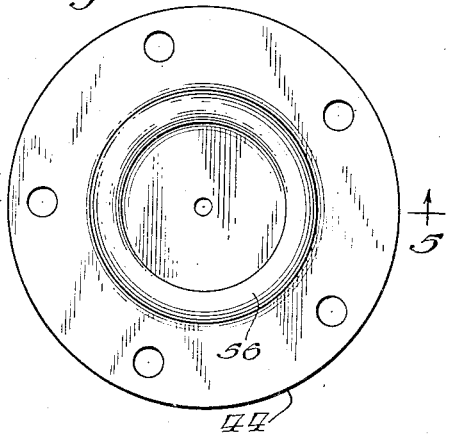
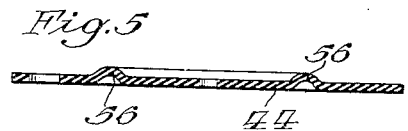
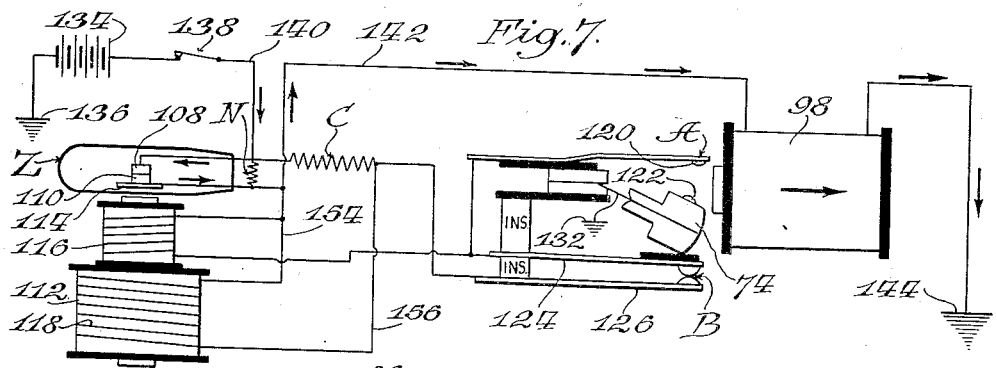
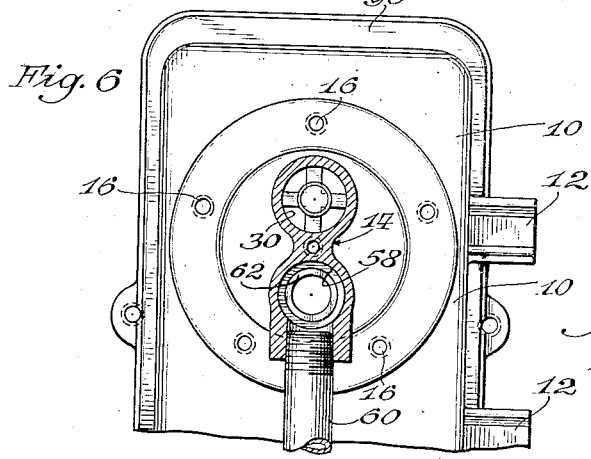
Inventor:
John B. Whitted
By Williams, Bradbury,
McCaleb & Hinkle.
Attys.

Aug. 15, 1939.    J. B. WHITTED    2,169,862
ELECTRIC FUEL PUMP
Filed March 5, 1937    3 Sheets-Sheet 2
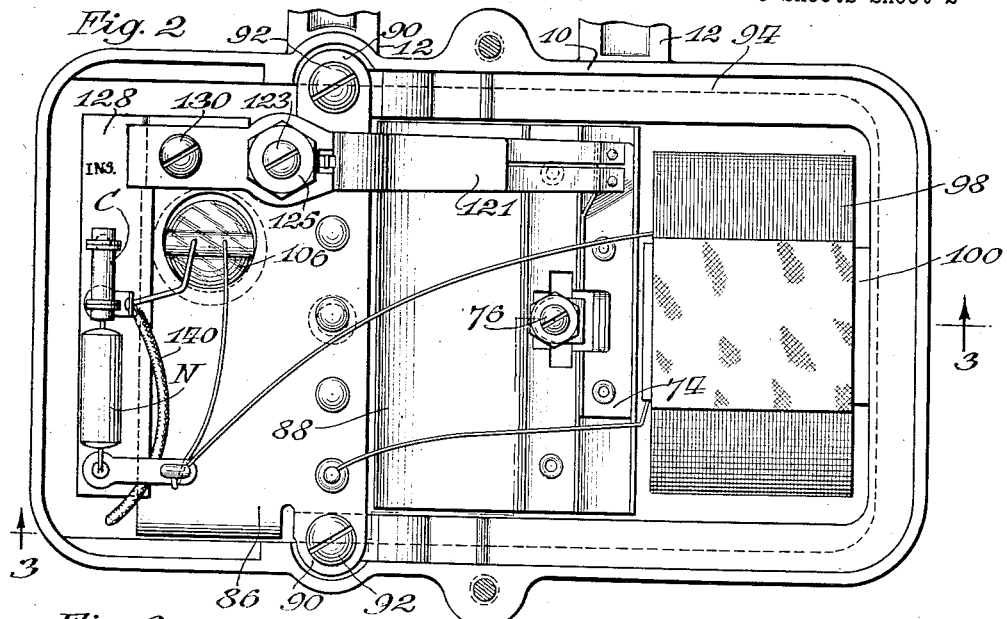
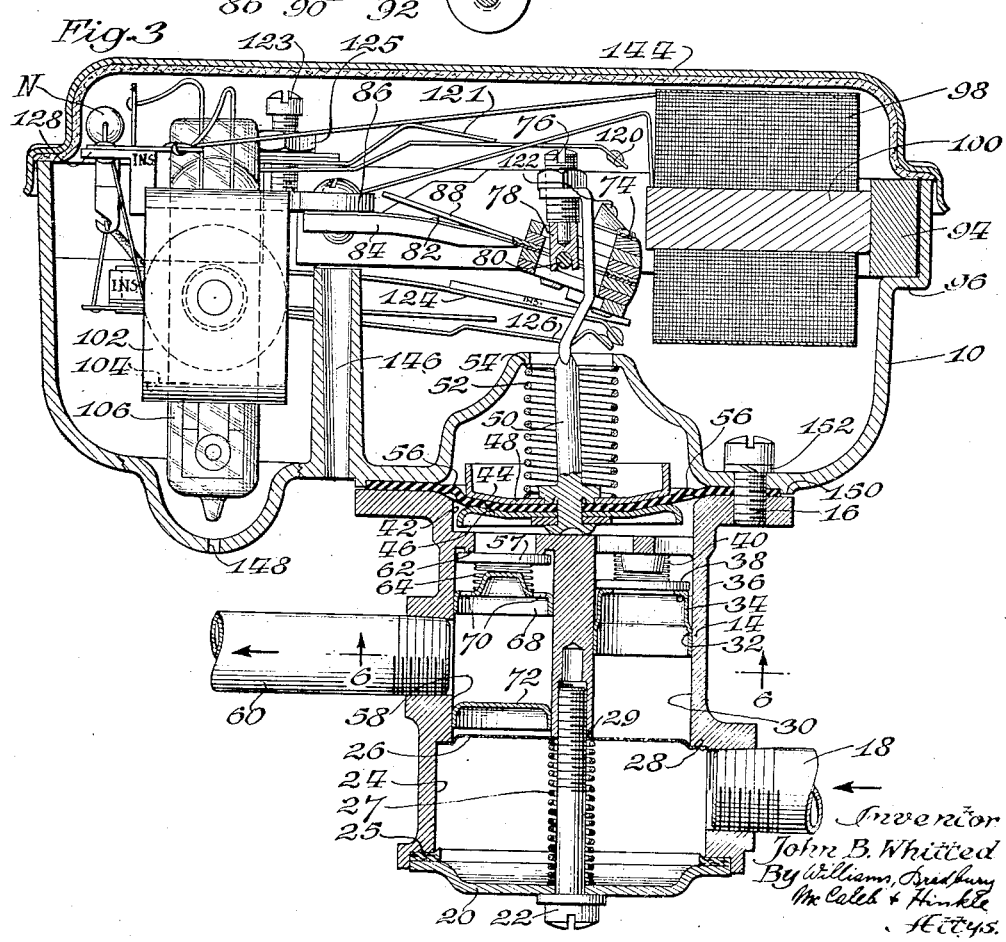
Inventor
John B. Whitted
By Williams, Bradbury,
McCaleb & Hinkle
Attys.

Aug. 15, 1939.　　　　J. B. WHITTED　　　　2,169,862
ELECTRIC FUEL PUMP
Filed March 5, 1937　　　3 Sheets-Sheet 3

Inventor:
John B. Whitted
By Williams, Bradbury, McCaleb & Hinkle
Attys.

Patented Aug. 15, 1939

2,169,862

UNITED STATES PATENT OFFICE 2,169,862

ELECTRIC FUEL PUMP

John B. Whitted, Glencoe, Ill., assignor to Stewart-Warner Corporation, Chicago, Ill., a corporation of Virginia Application March 5, 1937, Serial No. 129,108

14 Claims. (Cl. 103—150)

My invention relates to electric fuel pumps and is more particularly concerned with an electric fuel pump adapted for use on automobiles and other motor vehicles.

The invention disclosed and claimed herein is an improvement on the electric fuel pump disclosed and claimed in my prior application Serial No. 67,527, filed March 6, 1936.

It is customary to provide mechanically driven fuel pumps with filters, whereby any water and dirt which may be contained in the fuel is separated therefrom as it passes through the fuel pump. In attempting to apply the conventional filter to the electric fuel pump disclosed in my said prior application, I found that the results were unsatisfactory and that the efficiency of my fuel pump was materially decreased.

An object of my present invention is to provide a combination electric fuel pump and filter therefor which is efficient and satisfactory in operation.

Another object of my invention is to provide a more efficient electric fuel pump.

Another object of my invention is to provide an electric fuel pump which will operate satisfactorily at extremely low temperatures.

Another object of my invention is to provide an improved diaphragm for an electric fuel pump.

Another object of my invention is to provide an improved motor circuit for my electric fuel pump.

Another object of my invention is to provide an electric fuel pump which will operate satisfactorily and efficiently throughout a wide range of voltage variation of the actuating current.

Another object of my invention is to provide an electric fuel pump having improved means for supporting and protecting the operating parts.

Other objects and advantages will become apparent as the description proceeds.

Referring to the drawings;

Figure 1 is a vertical end elevation of my improved electric fuel pump;

Figure 2 is a horizontal section taken on the line 2—2 of Figure 1;

Figure 3 is a vertical section taken on the line 3—3 of Figure 2;

Figure 4 is a view of my improved diaphragm;

Figure 5 is a section taken on the line 5—5 of Figure 4;

Figure 6 is a horizontal section taken on the line 6—6 of Figure 1. In this section the valves are shown as removed; and Figures 7, 8, 9, 10, and 11 are diagrammatic views of the circuit arrangement of my improved electric fuel pump, illustrating different phases of the operating cycle.

Figure 8:
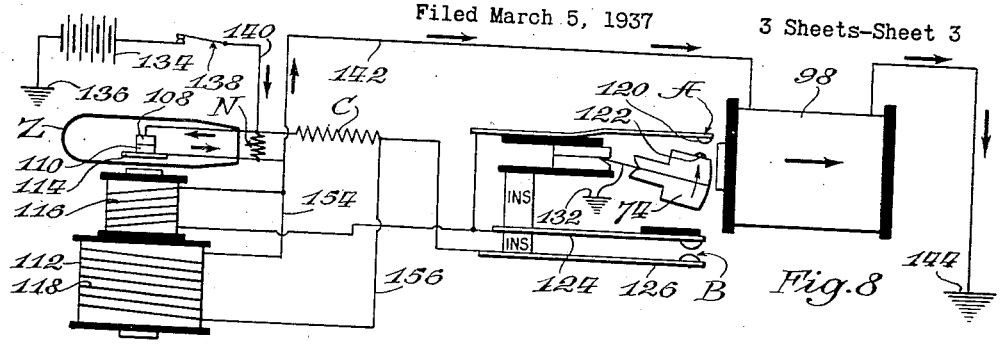

Referring to the drawings, I have shown my electric fuel pump as including a die-cast or drawn steel housing 10 provided with a pair of bosses 12 which are tapped to receive the bolts used in attaching the housing cast to the frame of the automobile. An important feature of my electric fuel pump is the fact that this pump can be located at any part on the frame of an automobile or other vehicle. I prefer to locate my electric fuel pump at the rear of the automobile frame adjacent the usual fuel tank, and preferably my fuel pump is so located that it is not exposed to the heat of the exhaust pipe or gas discharged therefrom. In this manner the most common cause of vapor lock is eliminated.

A casing 14 is attached to the housing 10 as by means of screws 16. This casing 14 has connected thereto one end of the fuel supply pipe 18, which connects the fuel pump with the main fuel tank of the automobile. The inlet pipe 18 discharges into the bottom of the casing 14 which is closed at its lower end by a cover 20 removably attached to the casing 14 by means of a screw 22. The chamber 24 immediately above the cover 20 constitutes the water trap of my improved fuel pump, and is sealed against leakage by a gasket 25.

Fuel entering the fuel pump through the pipe 18 must first pass through a wire screen 26 which is resiliently held by spring 27 against shoulders 28 and 29 provided by the casing 14. This screen 26 removes all impurities from the fuel before it reaches the fuel pump chamber. The particular arrangement of chamber 24 and screen 26 disclosed herein, cooperates with the rest of the mechanism to provide maximum efficiency of operation in a manner which will be hereinafter described.

Fuel passing through screen 26 then passes upwardly through a cylindrical passage 30 containing a tubular member 32 which is press fitted into the cylindrical passage 30 of the casing 14. The upper part of the tubular member 32 is of smaller diameter as indicated at 34, so that when the tubular member 32 is pressed into the passage 30, the valve seat 36 will not be distorted.

A disc valve 38 is pressed against the valve seat 36 by a light spring 40 which rests on a spider integral with the casing 14. Fuel passing upwardly through the passage 30 displaces the valve 38 and flows upwardly through the openings in the spider and then into the diaphragm chamber 42. The upper part of this chamber is closed by a diaphragm 44 whose periphery is clamped between the housing 10 and the upper part of the casing 14. The central portion of the diaphragm 44 is clamped between the opposed metal discs 46 and 48 held together by the lower end of the piston rod 50. This rod raises the diaphragm and plates against the tension of a spring 52, whose upper end rests against a shoulder 54, provided by the housing 10.

The diaphragm 44 may be made of any suitable material, but I prefer to make this diaphragm of synthetic rubber strengthened by a reinforcing layer of fabric embodied in the synthetic rubber. In cold weather where a normally flat diaphragm is used the diaphragm becomes stiffened and the pump requires considerable force initially to flex the diaphragm under these conditions. In order to reduce the force necessary to start pump operation in cold weather, I provide my improved diaphragm with an upwardly projecting, annular groove 56, as most clearly shown in Figs. 4 and 5. By referring to Fig. 3, it will be seen that this groove lies just outside of the upper plate 48. The presence of this groove 56 permits the grooved part of the diaphragm to roll upon itself under all positions of the diaphragm and its associated plates 46 and 48. This grooved diaphragm thus substitutes a rolling motion for a stretching or compressing action between parts of the diaphragm when it is stiffened due to cold weather, and in this manner the force required to start the pump is materially reduced.

The fuel displaced from the diaphragm chamber 42 moves the disc valve 57 downwardly and flows therepast into the cylindrical passage 58 which communicates with the discharge pipe 60 leading to the engine carburetor. The valve 57 is pressed against the seat 62 by a spring 64 resting upon a support 68 pressed into the upper end of the cylindrical passage 58. This support 68 has ports 70 to permit the flow of fluid therethrough. The lower end of the passage 58 is closed by a metal cup 72 which is press fitted into the passage 58, and which prevents direct communication between the chamber 24 constituting the water trap and the discharge pipe 60.

The piston rod 50 for raising the pump diaphragm, extends upwardly through an opening provided in an armature 74. The piston rod is connected to the armature by means of an adjusting screw 76, a block 78, and a transverse pin 80, which forms part of the armature.

The armature 74 is connected to one end of a spring 82 which forms a flexible pivotal support for the armature. The other end of this spring 82 is secured between a guide plate 84 and a supporting plate 86. Overlying the spring 82, and preventing the creation of sharp bends and undue stresses therein, is a protective plate 88 whose right hand end is attached to the armature 74.

The supporting plate 86 has laterally extending ears 90 which are secured by means of bolts 92 to the ends of a U-shaped frame 94, which rests upon a similarly U-shaped shoulder 96, provided by the housing 10. The armature 74 and diaphragm 44 are pulled upwardly against the tension of the spring 52 by an electromagnet 98 whose core 100 is riveted or welded or otherwise attached to the U-shaped frame 94 as indicated in Fig. 3.

The supporting plate 86 has a depending portion 102 which terminates in a lower horizontal portion 104. The lower horizontal portion 104 and the upper horizontal portion of the plate 86 have aligned openings for receiving the glass tube 106 of the main switch Z which controls the flow of electric current through the motor magnet 98. The glass tube 106 is secured to the upper and lower portions of the plate 86 by lacquer which is applied to adjacent portions of the glass tube and plate 86. When this lacquer dries it securely attaches the glass tube to the adjacent portions of this plate.

The glass tube 106 is sealed and is filled with an inert gas. This tube contains a fixed contact 108, and the movable contact 110, which are biased towards each other by a spring not shown; thus the contacts 108 and 110 are separated by the force exerted by a switch magnet 112 upon an armature 114 attached to the movable contact 110. Several switch structures suitable for this purpose are disclosed in my prior application and need not be described in detail herein.

The switch magnet 112 comprises a smaller coil 116 and a larger coil 118. Each of these coils consists of the same number of turns of wire, but the wire used in making the coil 118 is of larger diameter than that used in making the coil 116. For this reason the coil 118 is of less resistance than the coil 116. The switch magnet is part of a secondary electric circuit including secondary switches A and B, and resistance C.

The switch A comprises a stationary, resiliently mounted contact 120 and a movable contact 122 mounted on the armature 74. The position of the contact is determined by a stop finger 121. The contact 120 and stop finger 121 can be accurately positioned by means of adjusting screw 123 and nut 125 without detracting from the resiliency of the mounting of the contact 120. The switch B comprises contacts 124 and 126 which are normally separated but which are engaged whenever the armature reaches the bottom of its stroke as indicated in Fig. 7.

The contacts 120, 124, and 126 are mounted on an insulating block 128 which is attached to the metal plate 86 as by screw 130. The block 128 also carries the resistance C and a resistance N which is connected across the main switch Z. The switches A and B may have the structure and mode of adjustment described in my prior application. The contact 122 of switch A is grounded to the automobile frame through the armature 74 and its supporting means, as indicated at 132 in Figs. 7 through 11.

As indicated in these figures, the automobile has the usual battery 134, grounded to the automobile frame as shown at 136 and connected to the ignition switch 138. A conductor 140 connects the latter with contact 108 of the main switch Z. In actual practice the conductor 140 comprises a wire leading from the ignition switch to the outer end of a binding post mounted at a convenient place in the wall of the housing 10 and a second wire leading from the inner end of the binding post to the lead of contact 108. A second conductor 142 connects the other contact 110 with the motor magnet coil 98 which is grounded at 144 to the automobile frame.

The U-shaped frame 94 is not attached to the shoulder 96 of housing 10, but simply rests thereon. By simply disconnecting one end of conductor 140 and disengaging the upper end of piston rod 50 from armature pin 80, the frame 94 and all of the mechanism attached thereto may be removed from the housing 10.

A removable cover 144 normally closes the upper end of the housing 10 and protects the parts against dirt and water. The housing is provided with a breather opening 146 which prevents the accumulation of moisture inside the housing. A drain hole 148 carries off the water in case of a total submergence of the housing 10.

In automotive practice a six volt battery is used but when a weak battery is used to start an automobile in cold weather, the voltage available to operate a fuel pump may drop to three and one-half volts. Ordinarily the carburetor float bowl holds sufficient fuel to start the engine, but in some instances the fuel leaks out of the float bowl and the fuel pump must furnish the fuel during the starting operation. The other extreme of voltage variation to which my fuel pump is subjected, is created by the generator for charging the automobile battery. This generator (not shown) frequently creates as much as nine volts.

In order to be certain that the fuel pump will operate satisfactorily under the severest conditions, the automobile manufacturers require that the fuel pump start and continue to deliver a satisfactory volume of fuel on three volts and at a temperature of ten degrees below zero Fahrenheit. They also require that the fuel pump operate without pounding or thumping on nine volts and at summer temperatures. The pump disclosed in this application is capable of meeting these drastic requirements.

In a typical installation, the motor magnet 98 has a resistance of one and one-half ohms; the coils 116 and 118 have resistance of 18 and 15 ohms, respectively; and the resistance elements C and N have resistances of 15 and 50 ohms, respectively. Coils 116 and 118 each have 1100 turns, the difference in size and resistance being due to the use of different diameter wire. The core 100 of the motor magnet is made of such size and material that it becomes saturated at six volts, wherefore the force exerted by this magnet on armature 74 does not increase with higher voltages and pounding and thumping are eliminated.

The arrangement of the coils 116 and 118 and resistance C in the secondary circuits is such that maximum power with low voltage is obtainable to break the main switch Z with minimum utilization of power at other times. This arrangement also prevents pitting of the contact points of switches A and B.

Other advantages of the circuit arrangements will be apparent from the description of the operation of my fuel pump.

Before describing in detail the mode of operation of my invention, I wish first to call attention to several structural features which have not heretofore been sufficiently described. Referring, first, to Figures 1 and 6, the bosses 12 are shown as extending laterally from the housing 10. Where a die-cast housing is used, these bosses 12 will, of course, be an integral part of the casting. Where the housing 10 is stamped, the bosses 12 may be welded thereto, although with a stamped housing 10 I prefer to make these bosses an integral part of the upper end of the casting constituting the filter casing 14.

In Figure 3, I have shown the pump diaphragm 44 as having its periphery clamped between the upper end of the casing 14 and the adjacent part of the housing 10. It is undesirable to clamp this diaphragm too tightly. I therefore provide this part of the housing 10 with an annular flange 150 of such height that the diaphragm is firmly clamped in place when the upper end of the casing 14 is drawn up into tight engagement with this flange. The provision of this flange makes it possible to apply the necessary force on the lock washers 152 without injuring the diaphragm 44.

I have obtained the best results when the filter screen 26 is so made that prior to assembly in the casing 14, the central portion of this screen bulges downwardly. After this screen has been assembled as shown in Figure 3, the spring 27 holds the central portion of the screen 26 up in horizontal position and thereby presses the edge of the screen firmly against the shoulder 28 so that no leakage can occur around the periphery of the screen.

My invention operates in the following manner: When the ignition switch of the automobile is open the parts assume the positions shown in Figures 3 and 7. When the ignition switch 138 is closed, current flows through conductor 140, main switch Z, conductor 142, and coil 98 to ground, as indicated by arrows in Figure 7. At the same time the lower ends of coils 116 and 118 are connected through resistance C to conductor 140 and the other ends of these coils are connected to conductor 140 by wire 154 but no current flows through coils 116 and 118 at this time.

The current flowing through coil 98 of the motor magnet energizes this magnet and pulls armature 74 upwardly. The grooved diaphragm 44 materially reduces the force which the motor magnet must exert in cold weather to start the pump. As the armature 74 starts its upward movement, the contacts of switch B separate, as indicated in Figure 8, thereby breaking the circuit through coil 116.

As the armature 74 moves upwardly it raises the diaphragm 44 against the resistance of spring 52. This causes fuel to enter chamber 24 through pipe 18 leading from the main fuel tank. Any water entering with the fuel stays in chamber 24, whereas the fuel passes upwardly through dirt-removing screen 26, past valve 38, and into the enlarging chamber 42 beneath the diaphragm 44.

Figure 9:
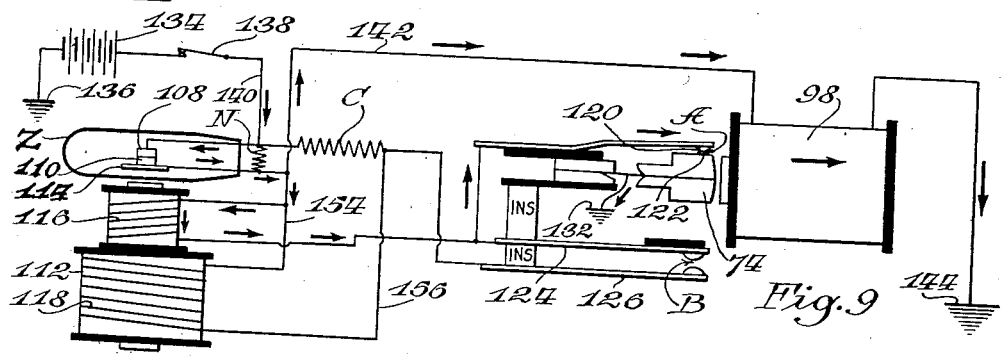

Just before the diaphragm 44 is stretched taut the contacts of switch A engage and ground coil 116 through armature 74, as shown in Figure 9, which indicates the conditions at the instant the contacts of switch A engage. The resultant energization of the switch magnet attracts the armature 114 of the main switch Z and opens this switch, thereby breaking the circuit through the motor magnet. The high resistance N connected across the main switch Z reduces arcing at the main switch contacts. It is to be noted that the full battery voltage is impressed on coil 116 to open the main switch.

Maximum efficiency is only possible where the inertia of the fuel entering the diaphragm chamber 42 is utilized to bulge the diaphragm 44 upwardly to its fullest extent. The filter parts have been specially designed to make this possible. The chamber 24 and screen 26 are so shaped and arranged that the fluid in the left hand part of chamber 24, as viewed in Figure 3, is quiescent and acts like a solid which does not interfere with the right angled turn executed by the fluid as it enters chamber 24 from pipe 18 and then passes upwardly to the diaphragm chamber 42 by way of passage 30.

In a diaphragm pump of the type which I have disclosed, the maximum efficiency, quietness, economy, and smoothness of operation obtain when the timing of the parts is such that the upward pull of the armature on the diaphragm ceases just before the diaphragm is pulled to tautness. This eliminates the wear and tear to which the diaphragm is subjected when it is pulled taut by the armature and thereby greatly prolongs the life of the diaphragm. This also eliminates the vibration and water hammer which are present when the diaphragm is pulled taut by the armature. When the timing is such that the central portion of the diaphragm ceases its upward movement just before the diaphragm is taut, there is a slight slack in the diaphragm which hangs downwardly at the instant the central portion of the diaphragm ceases its upward movement. The inertia of the inflowing fuel swells this slack portion of the diaphragm upwardly and thereby fills the diaphragm chamber to maximum capacity. At the same time the inflow of fuel is cut off gradually as the diaphragm is swelled upwardly to its maximum extent and this gradual cutting off of the inflow of fuel eliminates water hammer.

Figure 10:
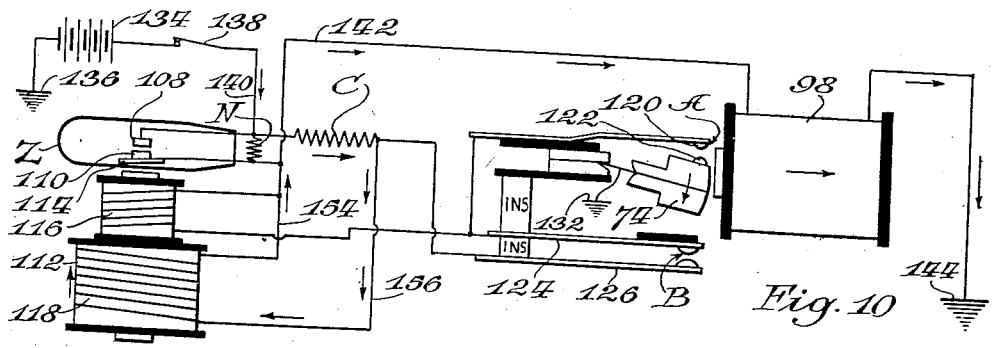
Figure 11:
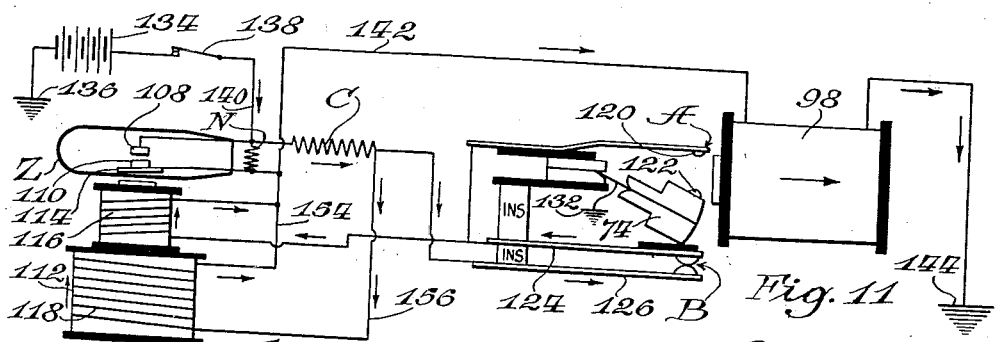

At the instant the main switch Z opens, the circuit through coil 116 is broken. Simultaneously therewith, a lesser and more economical current is established through switch magnet coil 118 which holds the main switch Z open. As shown in Figure 10, this current flows through conductor 140, resistance C, wire 156, coil 118, wire 154, conductor 142, and coil 98 to ground. This current is not sufficient to energize the main motor magnet appreciably.

The initial downward movement of armature 74 opens switch A but this produces no new result since the circuit through switch A and coil 116 has already been broken by the opening of the main switch Z. Continued downward movement of armature 74 and diaphragm 44 under the force of spring 52, displaces fuel from the diaphragm chamber 42 and forces the fuel past valve 56 and through pipe 60 to the engine carburetor.

When the armature 74 approaches the limit of its downward movement, it engages and closes switch B, thereby creating a current in coil 116. The magnetic effect exerted by coil 116 opposes and neutralizes that exerted by coil 118 on armature 114 so that main switch Z closes due to its own inherent bias and the cycle is repeated. While coil 118 is potentially more powerful than coil 116, this is offset by the relative positions of the two coils with respect to armature 114. The coils 116 and 118 are shown as wound in opposite directions. It is more economical as a practical matter to wind these two coils in the same direction and merely to reverse one of their leads so that the same result is obtained.

While I have illustrated and described a preferred embodiment of my invention, many modifications may be made without departing from the spirit of the invention, and I do not wish to be limited to the precise details of construction set forth but desire to avail myself of all changes within the scope of the appended claims.

Having thus described my invention, what I claim is:

1. An efficient electric fuel pump comprising a diaphragm, a diaphragm chamber, an electric motor for raising said diaphragm, a spring for lowering said diaphragm, means for cutting out said motor just prior to completion of the full upward movement of said diaphragm, whereby fuel entering said diaphragm chamber may bulge said diaphragm upwardly, and filter means associated with said diaphragm chamber and permitting fuel to flow thereinto to bulge said diaphragm upwardly, said filter means comprising a circular chamber forming a water trap, a screen above said chamber, and means providing a passageway connecting said last named chamber with said diaphragm chamber, said water trap chamber having an inlet adjacent said passage.

2. An efficient low power fuel pump of the class described, comprising a diaphragm, a diaphragm chamber having a fuel inlet and a fuel outlet, an electric motor for raising said diaphragm, a spring for depressing said diaphragm, said diaphragm having an annular upwardly projecting groove formed therein to reduce the resistance to movement of said diaphragm at low temperatures, said motor including a magnet having a core and a coil, said coil being adapted for connection to a source of current having a variable voltage, said core being of such size and material that it is magnetically saturated at a voltage lower than the maximum voltage of said source, and switch means alternately connecting and disconnecting said motor from said source.

3. An efficient electric fuel pump of the class described, comprising a variable chamber, an electric motor connected to a movable wall of said chamber for increasing the size of said chamber, a spring for moving said wall to decrease the size of said chamber, said chamber having a fuel inlet and a fuel outlet, a main switch for said motor, said main switch including a movable contact provided with an armature, a magnet core for attracting said armature to open said switch and hold it in open position, means for magnetizing said core to one degree to open said switch, and means for magnetizing said core to a less degree to hold said switch in open position.

4. An efficient electric fuel pump of the class described, comprising a variable chamber, an electric motor connected to a movable wall of said chamber for increasing the size of said chamber, a spring for moving said wall to decrease the size of said chamber, said chamber having a fuel inlet and a fuel outlet, a main switch for said motor, said main switch including a movable contact provided with an armature, a magnet core for attracting said armature to open said switch and hold it in open position, a coil surrounding said core, means for establishing a relatively high resistance circuit through said coil, and means for establishing a relatively low resistance circuit through said coil.

5. An efficient electric fuel pump of the class described, comprising a variable chamber, an electric motor connected to a movable wall of said chamber for increasing the size of said chamber, a spring for moving said wall to decrease the size of said chamber, said chamber having a fuel inlet and a fuel outlet, a main switch for said motor, said main switch including a movable contact provided with an armature, a magnet core for attracting said armature to open said switch and hold it in open position, a pair of coils surrounding said core, said coils being capable of electrically opposing each other, and means for establishing electrical circuits through said coils to control said switch.

6. An efficient electrical fuel pump of the class described, comprising a variable chamber, an electric motor connected to a movable wall of said chamber for increasing the size of said chamber, a spring for moving said wall to decrease the size of said chamber, said chamber having a fuel inlet and a fuel outlet, a main switch for said motor, said main switch including a movable contact provided with an armature, a magnet core for attracting said armature to open said switch and hold it in open position, a pair of coils surrounding said core, one of said coils being of less resistance than the other, and means for establishing electrical circuits through said coils to control said switch.

7. An efficient electric fuel pump of the class described, comprising a variable chamber, an electric motor connected to a movable wall of said chamber for increasing the size of said chamber, a spring for moving said wall to decrease the size of said chamber, said chamber having a fuel inlet and a fuel outlet, a main switch for said motor, said main switch including a movable contact provided with an armature, a magnet core for attracting said armature to open said switch and hold it in open position, a pair of coils arranged in tandem about said core, said coils having the same number of turns of wire, but the core farthest from said switch being formed of wire of larger diameter than the other coal, and means for establishing electrical circuits through said coils to control said switch.

8. An efficient electric fuel pump comprising a diaphragm, a diaphragm chamber, an electric motor for moving said diaphragm in one direction, a spring for moving said diaphragm in the opposite direction, means for cutting out said motor just prior to completion of one full movement of said diaphragm, whereby fuel entering said chamber may bulge said diaphragm to its fullest extent, and filter means associated with said diaphragm chamber and permitting fuel to flow thereinto to bulge said diaphragm, said filter comprising a chamber forming a water trap, a screen interposed between said last named chamber and said diaphragm chamber, outlet means connecting said water trap chamber with said diaphragm chamber, and inlet means for said water trap chamber.

9. An efficient electric fuel pump of the class described, comprising a diaphragm, a diaphragm chamber, an electric motor for moving said diaphragm in one direction, means for moving said diaphragm in the opposite direction, switch means for cutting out said motor just prior to completion of a full movement of said diaphragm, whereby fuel entering said diaphragm chamber may bulge said diaphragm to the limit of its movement, and filter means associated with said diaphragm chamber and permitting fuel under its own inertia to flow thereinto to bulge said diaphragm, said filter means comprising a water trap chamber, inlet means communicating with said water trap chamber at one side thereof, and outlet means connecting said water trap chamber with said diaphragm chamber, said outlet means communicating with said water trap chamber at a right angle to said inlet means.

10. An efficient electric fuel pump comprising a diaphragm, a diaphragm chamber, an electric motor for moving said diaphragm in one direction, other means for moving said diaphragm in the opposite direction, means for cutting out said motor just prior to completion of a full movement of said diaphragm, whereby fuel entering said diaphragm chamber may bulge said diaphragm to one limit of its movement, and filter means associated with said diaphragm chamber and permitting fuel to flow thereinto under its own inertia to bulge said diaphragm, said filter means comprising a water trap chamber having a part forming a dead space in which the liquid contents is quiescent, and another part connected with inlet and outlet means for fuel entering and leaving said chamber.

11. An efficient low power fuel pump of the class described, comprising a non-metallic diaphragm, a diaphragm chamber having a fuel inlet and a fuel outlet, an electric motor for moving said diaphragm in one direction, a spring for moving said diaphragm in the opposite direction, said diaphragm having an annular groove formed therein to reduce resistance to movement of said diaphragm at low temperatures, and switch means alternately connecting and disconnecting said motor with a source of current.

12. In a fuel pump of the class described, the combination of a diaphragm chamber, a diaphragm, an electric motor for operating said diaphragm, switch means for controlling said motor, a housing enclosing said motor and switch means, said housing including an internal shoulder, and a frame removably resting on said shoulder and having said motor and switch means unitarily attached thereto.

13. In a fuel pump of the class described, the combination of a diaphragm chamber, a diaphragm, a motor for operating said diaphragm, a filter casing providing a circular chamber forming a water trap, a circular passage extending upwardly from said water trap to said diaphragm chamber and constituting a fuel inlet for the latter, a second tubular passage leading downwardly from said diaphragm chamber and forming an outlet for the latter, means cutting off communication between said last named passage and said circular chamber, said casing providing a shoulder at the upper end of said circular chamber, a screen distorted into disc shape and thereby pressed firmly against said shoulder, a spring holding said screen in such distorted condition, and a removable closure for said circular chamber, said closure forming a support for said screen.

14. An efficient low power fuel pump of the class described, comprising a diaphragm, a diaphragm chamber having a fuel inlet and a fuel outlet, means including an electric motor for operating said diaphragm, a switch controlling said motor, a pair of coils for opening said switch, a circuit arrangement operative at one phase of motor operation to make said coils of substantially equal value, and a second circuit arrangement operative at another phase of motor operation to make said coils of unequal value.

JOHN B. WHITTED.